(12) United States Patent
Afsahi et al.

(10) Patent No.: US 7,333,790 B2
(45) Date of Patent: Feb. 19, 2008

(54) METHOD AND APPARATUS FOR GENERATING ARBITRARY PHASE SHIFT USING A PHASE SHIFTER BASED ON ADDING TWO PERPENDICULAR VECTORS WITH VARIABLE GAINS

(75) Inventors: Ali Afsahi, San Diego, CA (US); Arya Behzad, Poway, CA (US)

(73) Assignee: Broadcom Corporation, Irvine, CA (US)

( * ) Notice: Subject to any disclaimer, the term of this patent is extended or adjusted under 35 U.S.C. 154(b) by 469 days.

(21) Appl. No.: 11/102,515

(22) Filed: Apr. 8, 2005

(65) Prior Publication Data

US 2006/0229042 A1    Oct. 12, 2006

(51) Int. Cl.
*H04B 1/26* (2006.01)
(52) U.S. Cl. ............... 455/286; 455/289; 455/340; 333/139; 333/156
(58) Field of Classification Search ............ None
See application file for complete search history.

(56) References Cited

U.S. PATENT DOCUMENTS 6,906,601 B2 *  6/2005  Fayyaz ............... 333/156

6,999,746 B2 *  2/2006  Wang ............... 455/323
7,164,329 B2 *  1/2007  Toncich et al. ............ 333/139

OTHER PUBLICATIONS

Ellinger, et al., *Ultracompact Reflective-Type Phase Shifter MMIC at C-Band With 360° Phase-Control Range for Smart Antenna Combining*, IEEE Journal of Solid-State Circuits, 6 pages, vol. 37, No. 4, Apr. 2002.

Ellinger, et al., *Varactor-Loaded Transmission-Line Phase Shifter at C-Band Using Lumped Elements*, IEEE Transactions on Microwave Theory and Techniques, 6 pages, vol. 51, No. 4, Apr. 2003.

Ellinger, et al., *An Antenna Diversity MMIC Vector Modulator for HIPERLAN with Low Power Consumption and Calibration Capability*, IEEE Transactions on Microwave Theory and Techniques, 6 pages, vol. 49, No. 5, May 2001.

* cited by examiner

*Primary Examiner*—Thanh Cong Le

(57) ABSTRACT

A radio frequency (RF) phase shifter having an RC-CR circuit that includes a first capacitor having a first capacitor node and a second capacitor node and a first resistor coupled between the first capacitor node and a ground. The RC-CR circuit also includes a second resistor having a first resistor node and a second resistor node and a second capacitor coupled between the first resistor node and the ground. The RF phase shifter generates arbitrary phase shift by using a scheme of adding two perpendicular vectors with variable gains (or amplitudes).

25 Claims, 9 Drawing Sheets

METHOD AND APPARATUS FOR GENERATING ARBITRARY PHASE SHIFT USING A PHASE SHIFTER BASED ON ADDING TWO PERPENDICULAR VECTORS WITH VARIABLE GAINS

FIELD OF THE INVENTION

The invention relates to communication systems and, more particularly, to a phase shifter for phase shifting signals in a communication system.

BACKGROUND OF THE INVENTION

Electronic devices can now communicate with each other using a variety of wireless communication systems, such as wireless local area network (WLAN) systems, 802.11 network systems, WiFi network systems, etc. Demands for higher data rate wireless communication are increasing day to day and it is becoming difficult to achieve further improvement in spectral efficiency using only time and/or frequency domain methods.

Multiple antenna systems are known to be an efficient solution to increase data rate and/or increase robustness by taking advantage of multi-path scattering present in most indoor and urban environments. Phase shifters (PS) are used to set the phase of the received signal from each antenna. These radio frequency (RF) phase shifters have to meet certain requirements, such as having adjustable phase with the range of 360 degrees, having low loss and control complexity, consuming low power, and/or being compact and low cost to be able to be used in commercial applications. As such, it would be desirable to provide a phase shifter (e.g., an RF phase shifter) that has a high shift range, a small size, a low cost, and/or a low power consumption.

SUMMARY OF THE INVENTION

A system and/or method for providing an active phase shifter for an radio frequency (RF) communication system that have a high shift range, a small footprint, a low cost, and/or a low power consumption, substantially as shown in and/or described in connection with at least one of the figures, as set forth more completely in the claims.

BRIEF DESCRIPTION OF THE DRAWINGS

These and other features and aspects of the present invention will be more fully understood when considered with respect to the following detailed description, appended claims, and accompanying drawings.

DETAILED DESCRIPTION OF THE INVENTION

An exemplary embodiment of the present invention provides a phase shifter that is high in shift range, small in size, low in cost, high in performance, and/or low in power consumption. Signals of a RF phase shifter can be described in terms of one or more sinusoidal wave forms. For example, in a simple electronic-circuit application, a signal (e.g., a current or a voltage) can be varied sinusoidally as a function of time as represented below:

$$I(t) = A \sin(2\pi f t + \theta)$$

where A is the amplitude, f is the frequency, and $\theta$ is the phase angle with respect to some arbitrary phase angle. More specifically, the amplitude A is related to a peak signal value (e.g., a peak current or voltage) of the sinusoidal wave, the frequency f is related to the inverse of a period T of the wave, and the phase angle $\theta$ is the phase angle of the wave with respect to a phase reference. The phase reference can be chosen arbitrarily to define the initial value of the phase angle $\theta$ at the input to a RF phase shifter or RF phase shifting circuit.

In general, a phase angle $\theta$ is used to measure the progression of a periodic wave in time or space from a chosen instant or position. That is, the phase angle $\theta$ of the periodic wave having the frequency f which corresponds to the period T is the fractional part (t/T) of the period T through which t has shifted relative to an arbitrary origin or phase reference.

To simplify the following description, a phasor or vector concept is used to represent a sinusoidal wave. As is known to those skilled in the art, a phasor or a vector represents a particular complex number that contains information about a sinusoidal wave's amplitude A and phase angle $\theta$.

Figures 1A, 1B, 1C:
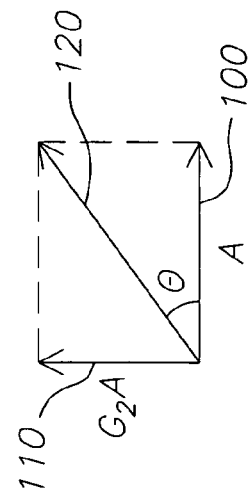
FIGS. 1A, 1B, 1C, 1D, 1E, and 1F illustrate two perpendicular vectors with variable amplitudes according to certain aspects of the present invention.

Referring now to FIGS. 1A to 1F, a concept of the present invention is to add two perpendicular vectors with variable amplitudes A together to represent a third vector. As is shown in FIG. 1A and assuming a constant frequency f is applied to two sinusoidal waves, the two waves can be represented by vectors 100, 110. As are shown in FIGS. 1B to 1C, by changing the amplitude A (e.g., by varying a gain) and adding these two vectors 100, 110 a third vector 120 having any phase angle $\theta$ between 0 and 90 degrees is achievable. In particular, by changing a first gain G1 of the vector 100 from 0 to 1, the phase angle $\theta$ of the third vector 120 will change from 90 degrees to 45 degrees and by changing a second gain G2 from 1 to 0, the phase angle (or phase) of the third vector 100 will change from 45 degrees to 0 degrees.

Figures 1D, 1E, 1F:
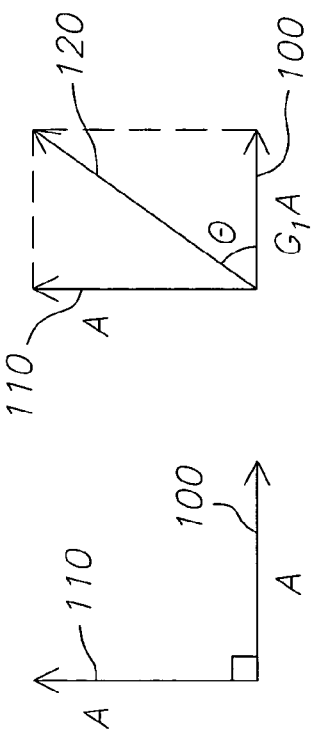

FIGS. 1D to 1F show exemplary embodiments (e.g., using inversely connected phase shifter components) to provide a negative vector 100' and/or a negative vector 110'. In particular, the addition of the positive vector 100 and the negative vector 110' results in a vector 130 as schematically indicated in FIG. 1D. The addition of the positive vector 110 and the negative vector 110' results in a vector 140 in FIG. 1E and the addition of the negative vector 110' and the negative vector 110' results in a vector 150 in FIG. 1F. As such, referring now to FIGS. 1A to 1F, by changing a gain of the vectors 100, 110, 100', and/or 110' from 0 to 1, the phase angle θ of the resultant vector (e.g., 120, 130, 140, 150, etc) can change from 0 to 360 degrees.

Figure 2:
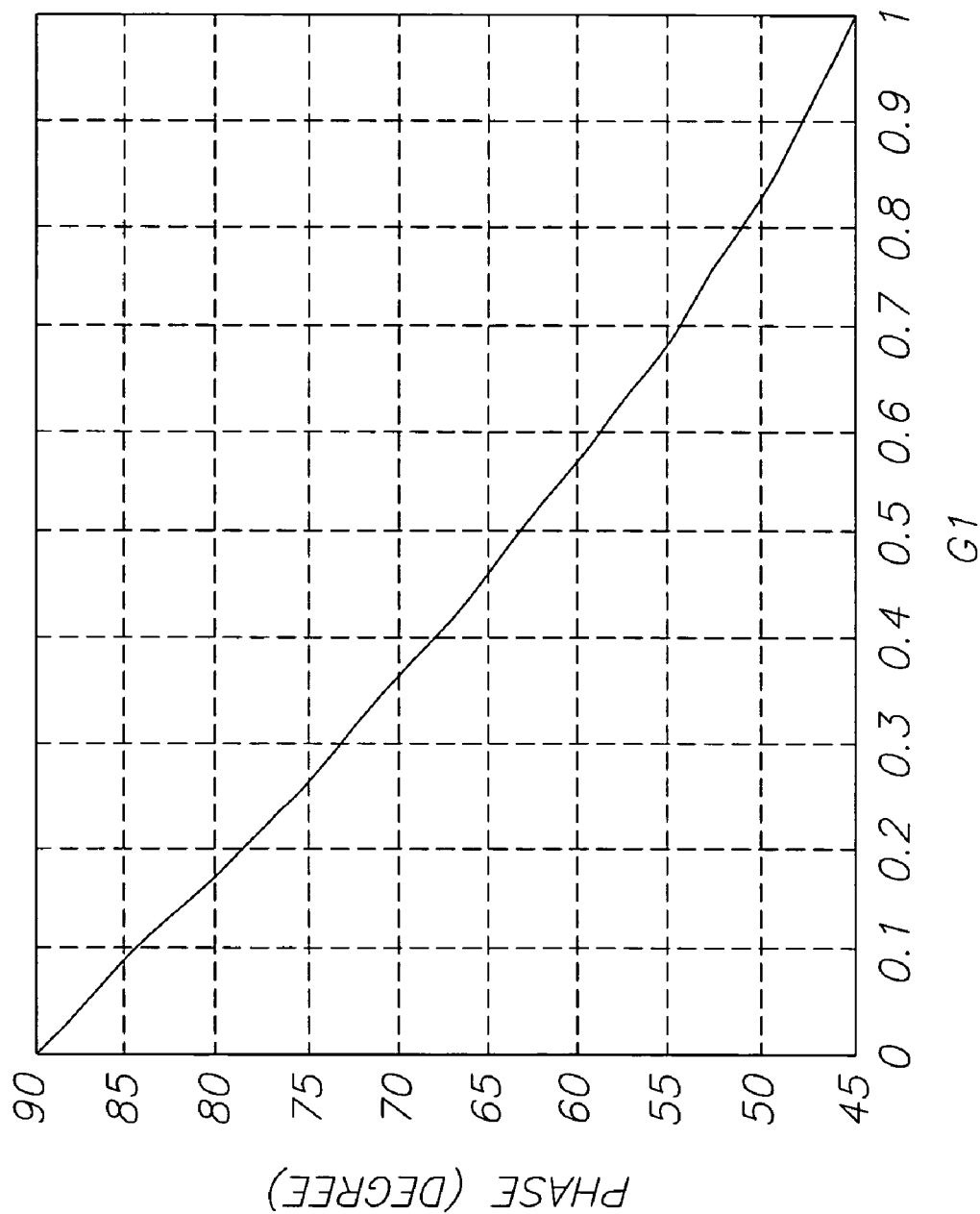
FIG. 2 illustrates a variation of a phase versus a gain of a vector according to certain aspects of the present invention.

FIG. 2 shows the variation of the phase angle (or phase) θ (in degree) versus the first gain G1 of the vector 100. As is shown in FIG. 2, the phase angle θ (in a substantially linear fashion) increases as the first gain G1 decreases and decreases as the first gain G1 increases.

As envisioned, an embodiment of the present invention is a phase shifter or an active RF phase shifter that is designed to produce the phase shift effects required for the operation of certain antenna systems or multiple antenna systems. The phase shifter can include non-silicon based technologies (e.g., technologies using gallium-arsenide (GaAs) MOSFET) and/or be implemented in CMOS.

In particular, an embodiment of the present invention uses two 90 degree phase shift signals and/or a simple RC-CR circuit with gain control to generate the vectors of FIGS. 1A to 1F to produce a 360 degree phase shift.

In addition, an embodiment of the present invention is an active phase shifter and/or uses transistors to perform amplitude (or gain) control rather then using a pure passive solution. As such, the size and cost of the embodiment of the present invention can be substantially less than a 360 degree phase shifter using an inductor and/or a passive phase shifter.

Figure 3A:
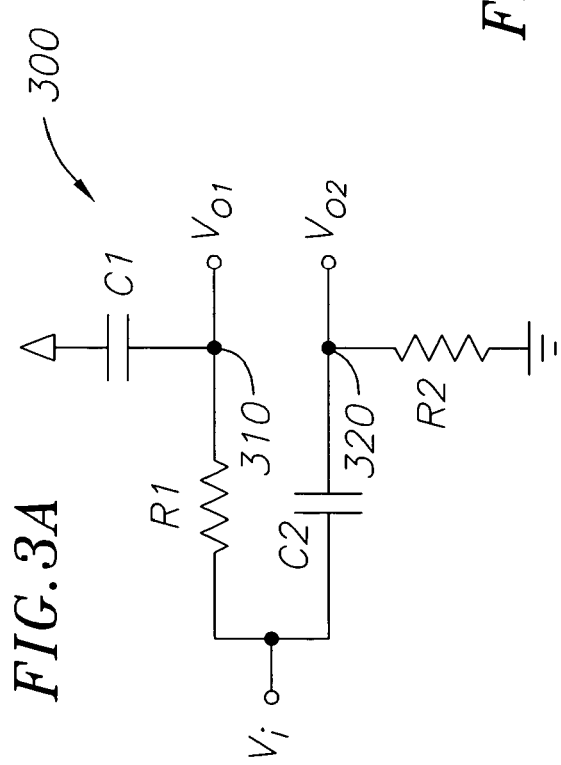
FIGS. 3A and 3B illustrate a phase shifter having an RC-CR circuit according to certain embodiments of the present invention.

Referring now to FIG. 3A, a phase shifter according to an exemplary embodiment of the present invention is provided. The phase shifter of FIG. 3A is a 90 degree phase shifter where the RC-CR network 300 shown in FIG. 3A is used. The RC-CR network 300 can be used as a broadband 90 degree phase shifter. The RC-CR network 300 includes an input Vi, first and second outputs Vo1, Vo2, first and second capacitors C1, C2, and first and second resistors R1, R2. The input Vi is connected to a ground voltage via the first resistor R1 and the first capacitor C1 in that order, and the first output Vo1 is connected to a first connection node 310 between the first resistor R1 and the first capacitor C1. In addition, the input Vi is connected to the ground via the second capacitor C2 and the second resistor R2 in that order, and the output Vo1 is connected to a second connection node 310 between the second capacitor C2 and the second resistor R2.

In operation, when the input (or input voltage) Vi is applied to the RC-CR network 300, the first and second outputs (or output voltages) Vo1, Vo2 are outputted with a 90 degree difference in phase (or phase angle). That is, the output Vo1 and the output Vo2 are given as follow:

$$V_{O_1} = \frac{\frac{1}{C_1 s} V_i}{R + \frac{1}{C_1 s}} = \frac{1}{1 + R_1 C_1 s} V_i$$

$$V_{O_2} = \frac{R_2 V_i}{R_2 + \frac{1}{C_2 s}} = \frac{R_2 C_2 s}{1 + R_2 C_2 s} V_i$$

where Vi represent voltage of the input Vi; $V_{o_1}$ and $V_{o_2}$ respectively represent voltage of the first and second outputs Vo1, Vo2; $R_1$ and $R_2$ respectively represent resistance of the first and second resistors R1, R2; $C_1$ and $C_2$ respectively represent capacitance of the first and second capacitors C1, C2; and s represent the complex frequency. Since s=jω and ω=2πf, the output Vo1 and the output Vo2 can also be given as follow:

$$V_{O_1} = \frac{1}{1 + R_1 C_1 j\omega} V_i$$

$$V_{O_2} = \frac{R_2 C_2 j\omega}{1 + R_2 C_2 j\omega} V_i$$

As such, the phase (or phase angle) of the first output Vo1 and the phase of the second output Vo2 are given as follow:

$$<V_{O_1} = <V_i - \tan^{-1}\frac{R_1 C_1 \omega}{1}$$

$$<V_{O_2} = <V_i + \frac{\Pi}{2} - \tan^{-1} R_2 C_2 \omega$$

where $<V_{o_1}$ and $<V_{o_2}$ respectively represent the phase of the outputs Vo1, Vo2; and <Vi represents the phase of the input Vi. Thus, if $R_1=R_2$ and $C_1=C_2$, the phase difference of the outputs Vo1, Vo2 (i.e., <Vo1-<Vo2) is equal to π/2 or 90 degrees. Also, at ω=1/$R_1C_1$ (or 1/$R_2C_2$), the amplitudes of the output Vo1 and the output Vo2 are equal.

Figure 3B:
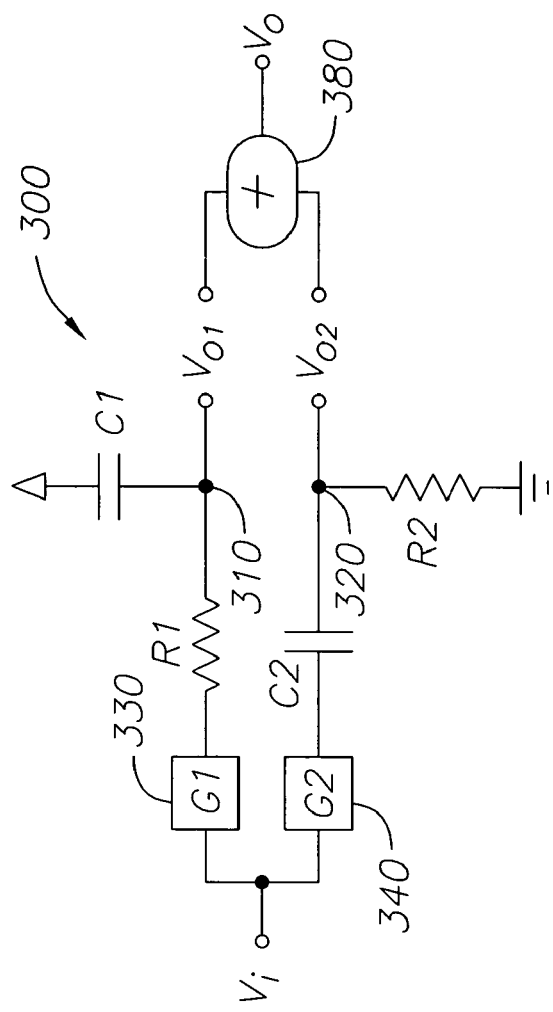

Referring now to FIG. 3B, a phase shifter according to an exemplary embodiment of the present invention is provided. The phase shifter of FIG. 3B is substantially similar to the 90 degree phase shifter of FIG. 3A with the addition of first and second gain controllers 330, 340 and an adder 380. Specifically, the phase shifter of FIG. 3B uses an RC-CR network 300' shown in FIG. 3B. The RC-CR network 300' of FIG. 3B is substantially similar to the RC-CR network 300 of FIG. 3A with the addition of the first gain controller 330 being connected to the first connection node 310 via the first resistor R1, the second gain controller 340 being connected to the second connection node 320 via the second capacitor C2, and the adder 380 being connected to the outputs Vo1, Vo2.

In operation, when the input (or input voltage) Vi is applied to the RC-CR network 300' and when no gains are provided by the first and second gain controllers 330, 340 (or gains are equal), the first and second outputs (or output voltages) Vo1, Vo2 are outputted with a 90 degree difference in phase (or phase angle) and equal in amplitude at ω=1/$R_1C_1$ (or 1/$R_2C_2$). In this case, the output Vo of the adder is outputted with a signal having a 45 degree difference in phase (or phase angle) with respect to the first output Vo1 or the second output Vo2 (e.g., see FIG. 1B). Moreover, by selectively changing the gain of the first and/or second gain controllers 330, 340, other desired phase or phase angle θ can be generated at the output Vo of the adder 380 (e.g., see FIG. 1C).

Figure 4:
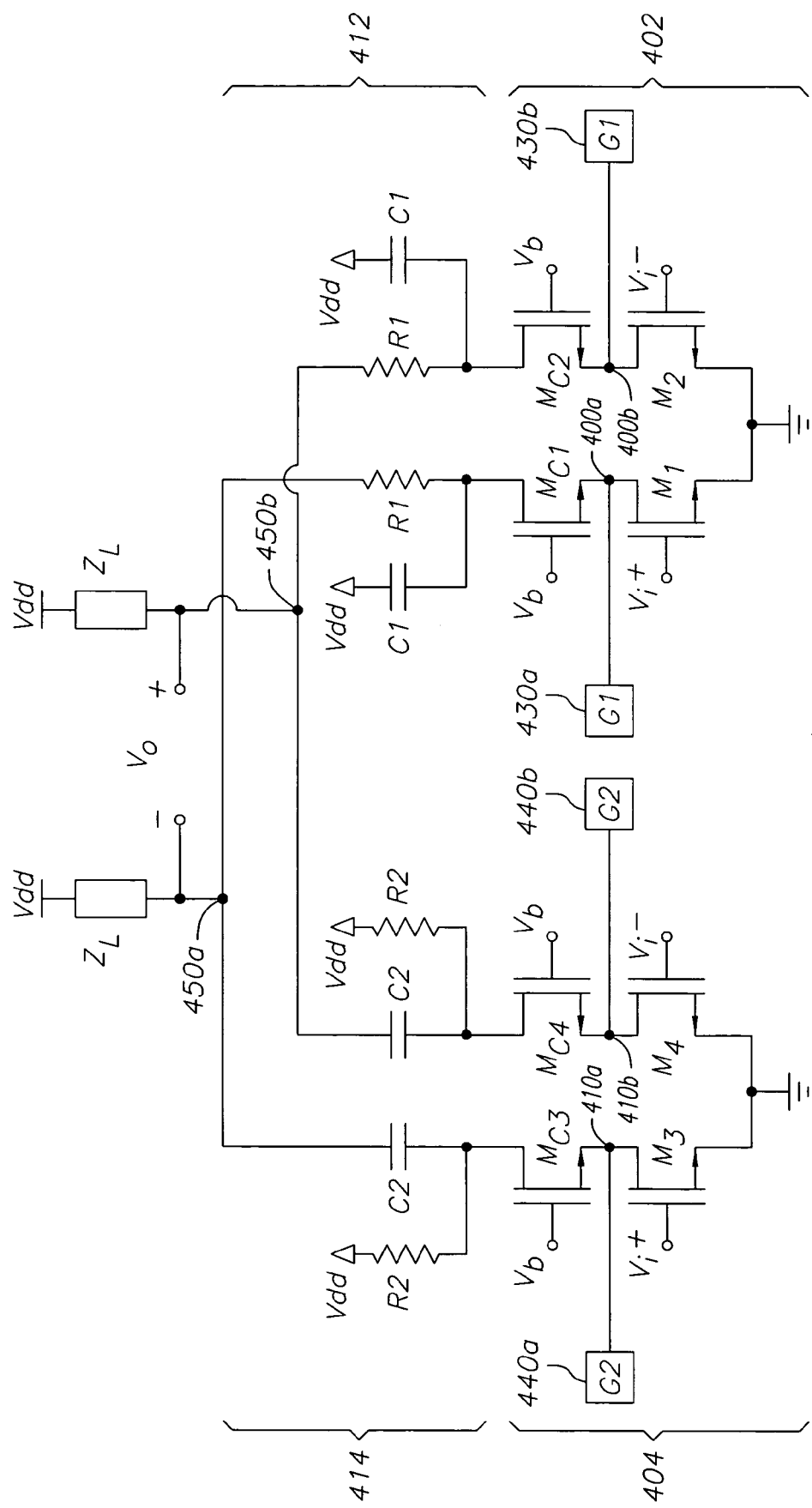
FIG. 4 illustrates a differential phase shifter according to an embodiment of the present invention.

FIG. 4 shows a differential circuit embodiment of the present invention. First and second differential pairs 402, 404 include differential inputs $V_i^+$, $V_i^-$ that are fed from an output of a previous stage (not shown). The first and second differential pairs 402, 404 convert voltage to current. By passing the currents through the RC-CR circuit pairs 422, 414 the 90 degree phase shifted signals are generated and they are added with each other in adders 450a, 450b to give the final signal (or final output voltage). By changing the gain of each of the first and second differential pairs 402, 404, via the gain controllers 430a, 430b, 440a, 440b, the desired phase or phase angle θ can be generated at the output of the adder 450a, 450b. To get 360 degree phase shifting, the embodiment of FIG. 4 just needs to change the polarity of the input of the differential pairs 402, 404.

In more detail, loads $Z_L$ are coupled to the first and second differential pairs 402, 404 via the adders 450a, 450b. The first and second differential pairs 402, 404 include cascoded transistor pairs having NMOS FETS (e.g. $M_{c1}$ and $M_1$) serially coupled together such that the source of a cascode transistor (e.g. NMOS FET $M_{c1}$) is coupled to the drain of a transconductance transistor (e.g. NMOS FET $M_1$) via a connection-control node (e.g., 400a). In addition, a gain controller 430a, 430b, 440a, 440b is respectively coupled to each connection-control node 400a, 400b, 410a, 410b. In this embodiment, at least one of differential input voltages $V_i^+$, $V_i^-$ is coupled to each of the transconductance transistors ($M_1$-$M_4$) of the first and second differential pairs 402, 404. The transconductance transistors ($M_1$-$M_4$) are for changing voltage(s) into current(s). Further, the cascode transistors ($M_{c1}$-$M_{c4}$) of the first and second differential pairs, 402, 404 are, by way of example, coupled to control voltages Vb. The cascode transistors ($M_{c1}$-$M_{c4}$) are for impedance balancing, gain control assisting, increasing output impedance, reducing an effective capacitance input, and/or improving linearity.

In operation, the first differential pair 402 converts a differential input voltage into a first differential current as a function of an input voltage $V_i^+$, $V_i^-$. In addition, the gain controllers 430a, 430b via the connection-control nodes 400a, 400b control a gain of the first differential current. In a similar manner, the second differential pair 404 controls the output current and gain of the second differential pair 404. For example, the gain controllers 440a, 440b via the connection-control nodes 410a, 410b control a gain of a second differential current after the second differential pair 404 current converts a differential input voltage into the second differential current in accordance with the input voltage $V_i^+$, $V_i^-$. As such, by passing the currents outputted from the first and second differential pairs 402, 404 through the RC-CR network pairs 422, 414, the 90 degree phase shifted signals are generated and they are added up in the adders 450a, 450b (and/or the loads $Z_L$) to give the final signal. In addition, by changing the gain of the each of the first and second differential pairs 402, 404 via the gain controllers 430a, 430b, 440a, 440b, the desired phase or phase angle θ can be generated after adding the two currents. To get 360 degree phase shifting, the embodiment of FIG. 4 just needs to change the polarity of the currents initially generated by one or both of the differential pairs 402, 404.

Figure 5A:
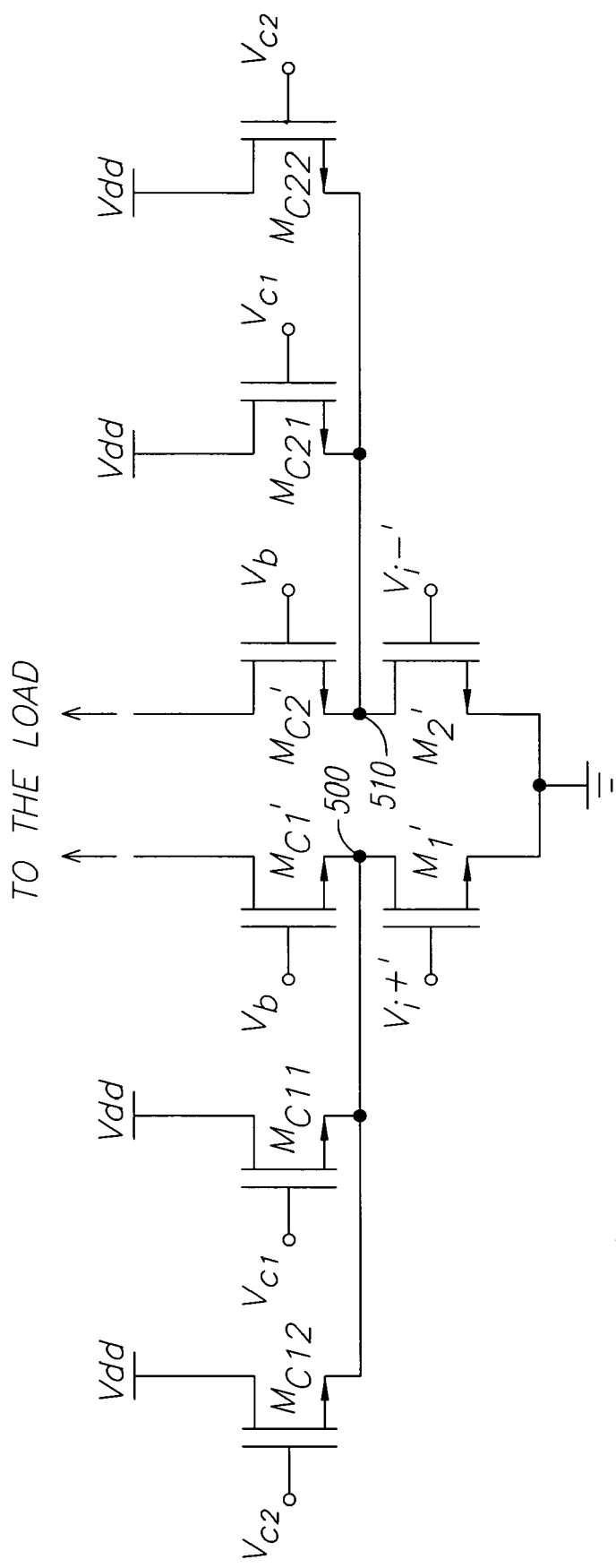
FIGS. 5A and 5B illustrate gain control components and/or polarity control components according to certain embodiments of the present invention.

Referring now to FIG. 5A, a gain of a phase shifter in one embodiment of the present invention is varied by controlling an amount of a current that passes through a load.

In particular, the embodiment of FIG. 5A includes first and second transconductance transistors $M_1'$, $M_2'$ for converting voltage to current and first and second cascode transistors $M_{c1}'$, $M_{c2}'$. The first and second cascode transistors $M_{c1}'$, $M_{c2}'$ are coupled to the first and second transconductance transistors $M_1'$, $M_2'$ via first and second connection-control nodes 500, 510 such that the source of a cascode transistor (e.g. NMOS FET $M_{c1}'$) is coupled to the drain of a transconductance transistor (e.g. NMOS FET $M_1'$). In addition, the first connection-control node 500 is coupled to one or more control transistors $M_{c11}$, $M_{c12}$ such that the source of each control transistor (e.g. NMOS FET $M_{c11}$ or NMOS FET $M_{c12}$) is coupled to the drain of the first transconductance transistor $M_1'$. The second connection-control node 510 is coupled to one or more other control transistors $M_{c21}$, $M_{c22}$ such that the source of each control transistor (e.g. NMOS FET $M_{c21}$ or NMOS FET $M_{c22}$) is coupled to the drain of the second transconductance transistor $M_2'$. In this embodiment, at least one of the input voltages $V_i^{+1}$, $V_i^{-1}$ is coupled to each of the transconductance transistors ($M_1'$, $M_2'$) and the cascode transistors ($M_{c1}'$, $M_{c2}'$) are coupled to cascode control voltage $V_b$. Further, the control transistors ($M_{c11}$, $M_{c12}$, $M_{c22}$, $M_{c22}$) of the first and second connection-control nodes 500, 510 are individually coupled to separate control voltages Vc1, Vc2 respectively.

In operation, when the control voltages Vc1, Vc2 are both low, all of the current (i.e., the desired signal) goes to the load. However, when one or both of the control voltages Vc1, Vc2 are high, some portion of the current goes to the load and the rest goes to a voltage $V_{DD}$ or a ground voltage. As such, by defining a size (e.g., an aspect ratio) of the control transistors ($M_{c11}$, $M_{c12}$, $M_{c21}$, $M_{c22}$) and/or the control voltages Vc1, Vc2, the embodiment can adjust how much current goes to the load via the cascode transistors ($M_{c1}'$, $M_{c2}'$) to thereby provide a variable and controllable gain.

Figure 5B:
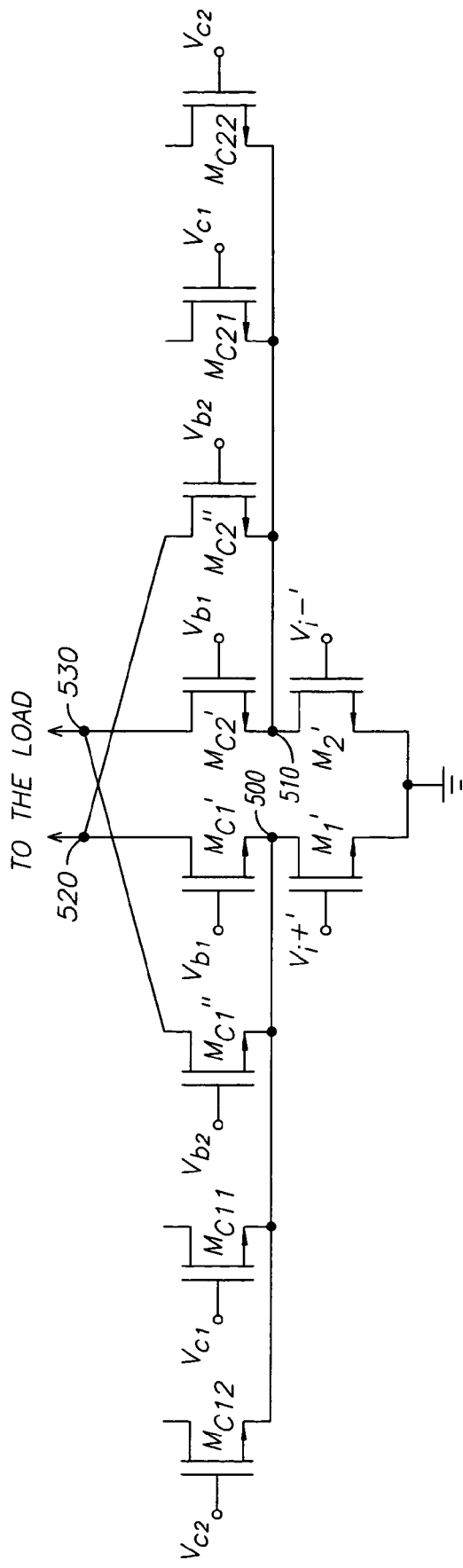

Referring now to FIG. 5B, to get 360 degree phase shifting, an embodiment of the present invention provides third and fourth cascode transistors ($M_{c1}''$, $M_{c2}''$) to change the polarity of the currents initially generated by a differential pair (e.g., the differential pair 402, 404 of FIG. 4).

As shown, the embodiment of FIG. 5B is substantially similar to the gain varying embodiment of FIG. 5A with the addition of the third and fourth cascode transistors ($M_{c1}''$, $M_{c2}''$). In particular, the first and second cascode transistors $M_{c1}'$, $M_{c2}'$ are coupled to the first and second transconductance transistors $M_1'$, $M_2'$ via first and second connection-control nodes 500, 510 such that the source of a cascode transistor (e.g. NMOS FET $M_{c1}'$) is coupled to the drain of a transconductance transistor (e.g. NMOS FET $M_1$). Similarly, the third and fourth cascode transistors $M_{c1}''$, $M_{c2}''$ are also coupled to the first and second transconductance transistors $M_1'$, $M_2'$ via the first and second connection-control nodes 500, 510 such that the source of a cascode transistor (e.g. NMOS FET $M_{c1}''$) is coupled to the drain of a transconductance transistor (e.g. NMOS FET $M_1'$). However, to provide the polarity change, the drain of the first cascode transistor $M_{c1}'$ is coupled to the first polarity-control node 520; the drain of the second cascode transistor $M_{c2}'$ is coupled to the second polarity-control node 530; the drain of the third cascode transistor $M_{c1}''$ is coupled to the second polarity-control node 530; and the drain of the fourth cascode transistor $M_{c2}''$ is coupled to the first polarity-control node 520. In this embodiment, the first and second cascode transistors ($M_{c1}'$, $M_{c2}'$) are coupled to cascode control voltage $V_{b1}$ and the third and fourth cascode transistors ($M_{c1}''$, $M_{c2}''$) are coupled to cascode control voltage $V_2$.

In operation, the embodiment of FIG. 5B provides a first polarity using the first and second cascode transistors ($M_{c1}'$, $M_{c2}'$) and provides a second polarity using the third and fourth cascode transistors ($M_{c1}''$, $M_{c2}''$). That is, in this embodiment, the first polarity is provided when $V_{b2}$ is low and $V_{b1}$ is high and the second polarity is provided when $V_{b2}$ is high and $V_{b1}$ is low.

Referring back to FIG. 4, each of the first and second differential pairs 402, 404 may include the gain control components and/or polarity control components of FIGS. 5A and/or 5B to provide a variable and controllable gain and/or to change a polarity of an input voltage. In one embodiment, the components for varying the gain of each of the first and second differential pairs 402, 404 are controlled separately (i.e., with control voltages Vc1, Vc2 for one differential pair 402, and different control voltages for another differential pair 404) in a manner that is substantially similar to how the first and second cascode transistors ($M_{c1}'$-$M_{c2}'$) and the third and fourth cascode transistors ($M_{c1}''$-$M_{c2}''$) of FIG. 5B are individually coupled to separate cascode control voltages Vb1 and Vb2. As such, the gain of the first and second differential pairs 402, 404 can be individually controlled by changing the logic level (i.e., switching between high and low logic level) of the separate control voltages.

Figure 6:
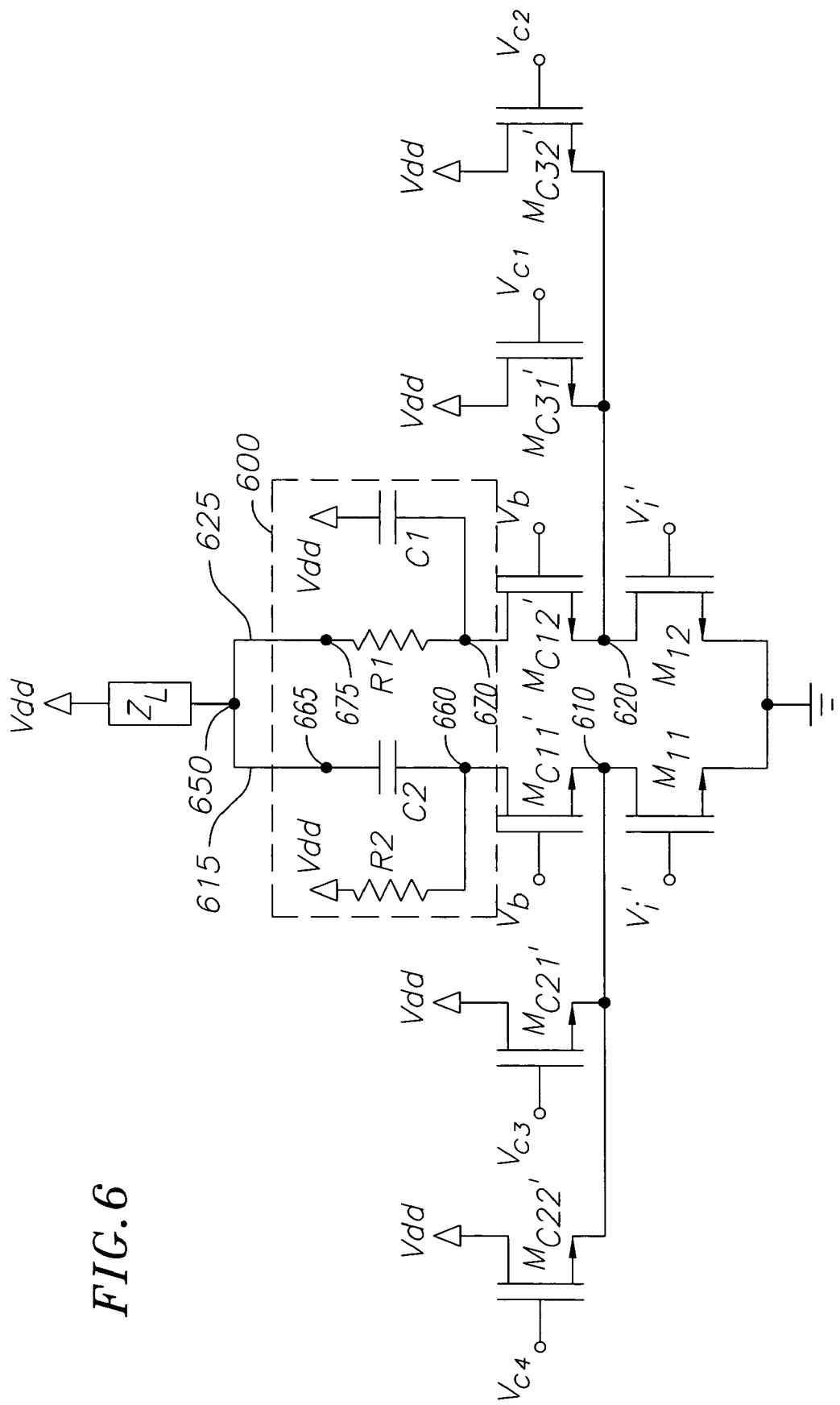
FIG. 6 illustrates a non-differential phase shifter according to an embodiment of the present invention.

One of skill in the art will appreciate that the invention is applicable to differential and/or non-differential implementations. For example, FIG. 6 shows a non-differential circuit embodiment of the present invention. The embodiment of FIG. 6 includes a load $Z_L$ coupled to an RC-CR circuit 600 via an adder 650. The RC-CR circuit 600 includes a capacitor C2 having a first capacitor node 660 and a second capacitor node 665 and a resistor R2 coupled between the first capacitor node 660 and a ground or a voltage Vdd. The RC-CR circuit 600 also includes a resistor R1 having a first resistor node 670 and a second resistor node 675 and a capacitor C1 coupled between the first resistor node 670 and the ground or the voltage Vdd. Cascode transistors $M_{c11}'$, $M_{c12}'$ are respectively coupled transconductance transistors $M_{c11}$, $M_{12}$ via connection-control nodes 610, 620. In addition, control transistors $M_{c31}'$, $M_{c32}'$ are coupled to the connection-control node 620 and control transistor $M_{c21}'$ and $M_{c22}'$ are coupled to the connection-control node 610. In this embodiment, an input voltage $V_i'$ is coupled to each of the transconductance transistors ($M_{c11}$-$M_{c12}$). The transconductance transistors ($M_{11}$-$M_{12}$) $M_{12}$) are for changing voltage(s) into current(s). The cascode transistors ($M_{c11}'$-$M_{c12}'$) are coupled to control voltages Vb. The cascode transistors ($M_{c11}'$-$M_{c12}'$) are for impedance balancing, reducing an effective capacitance input, gain control assisting, increasing output impedance, and/or improving linearity. Moreover, the control transistors $M_{c31}'$, $M_{C32}'$, $M_{c21}'$, $M_{c22}'$ are each respectively coupled to a control voltage Vc1, Vc2, Vc3, Vc4. The control transistors $M_{c31}'$, $M_{C32}'$, $M_{c21}'$, $M_{c22}'$ are for controlling a gain of the RC-CR circuit 600. As shown, the gain on each arm 615, 625 of the present embodiment can be individually controlled by individually changing the logic level (i.e., switching between high and low logic level) of the separate control voltages Vc1, Vc2, Vc3, Vc4.

Figure 7:
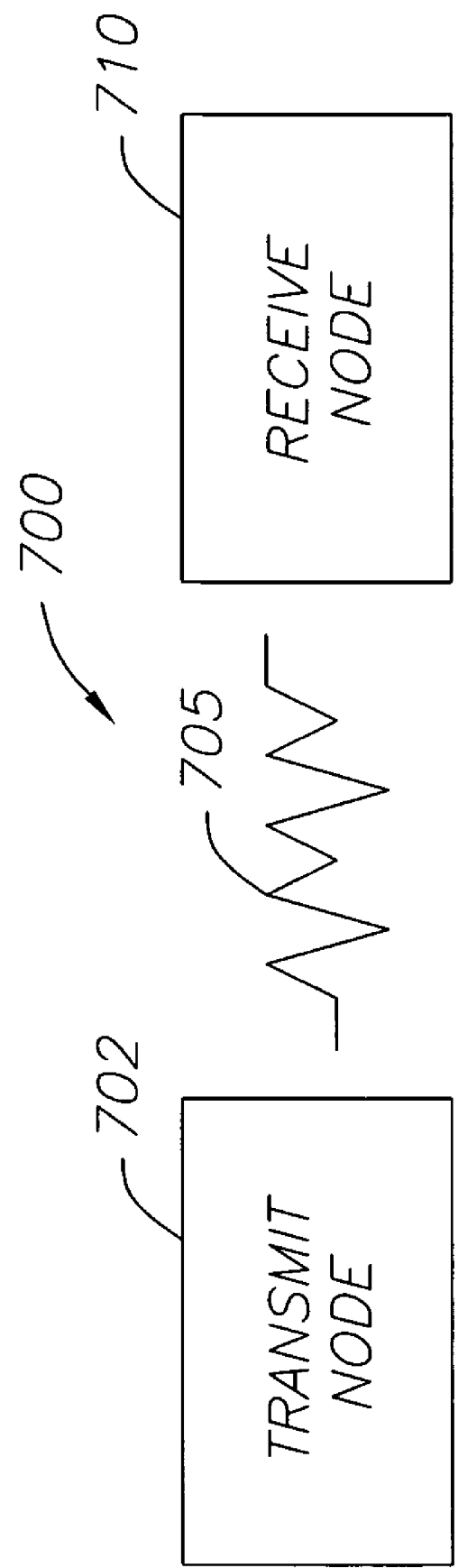
FIG. 7 illustrates a communication system having a transmit node and a receive node.

An exemplary phase shifter of the present invention may be integrated into any of a variety of RF circuit applications and/or wireless systems to increase their sensitivity at a minimal cost. For example, referring to FIG. 7, the described exemplary phase shifter may be incorporated into a receiving node 710 of a typical communication system 700 for receiving and processing radio frequency signals 705 from a transmit node 702 that transmits the transmitted RF signals. In addition, the described exemplary phase shifter and/or another phase shifter of the present invention may be incorporated into the transmit node 702.

Figure 8:
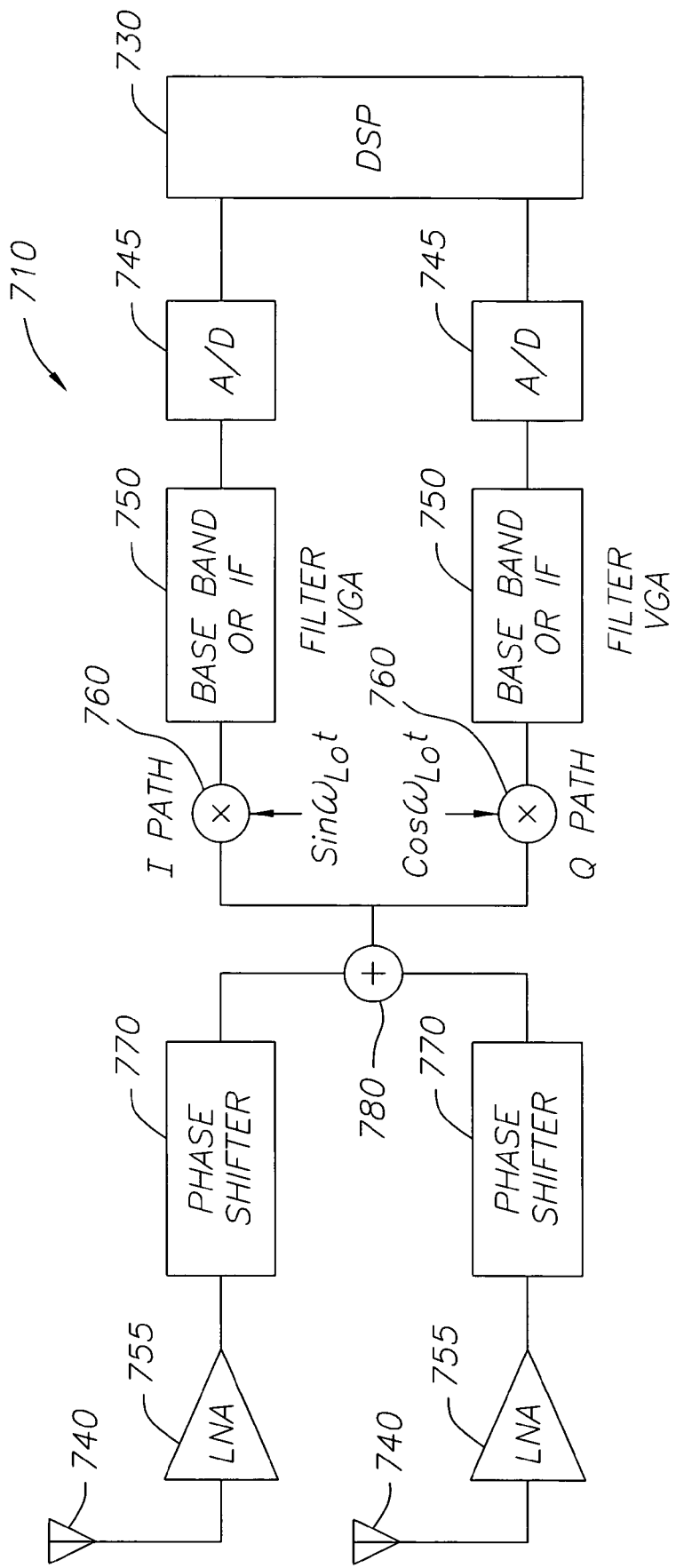
FIG. 8 illustrates the receive node of FIG. 7 according to an embodiment of the present invention.

Referring to FIG. 8, the receive node 710 includes phase shifters 770 (e.g., as illustrated in FIGS. 1, 2, 3, 4, 5 and/or 6), low noise amplifiers (LNAs), frequency mixers 760, intermediate processing stages 750, a digital signal processor (or a communications controller) 730, a combiner 780, and antennas 740. In one embodiment, the digital signal processor 730 is operating in accordance with one or more standards, including but not limited to, IEEE 802.11, Bluetooth, advanced mobile phone services (AMPS), global systems for mobile communications (GSM), code division multiple access (CDMA), local multi-point distribution systems (LMDS), multi-channel-multi-point distribution systems (MMDS), and/or variations thereof. In an exemplary embodiment, the digital signal processor 730 is coupled to the phase shifters 770 and is an integrated digital controller with multiple inputs and outputs, such as a transmit data output and a receive data input.

In the illustrated receiver node 710, each of the phase shifters 770 is coupled to a corresponding one of the antennas 740. In one embodiment, each of the phase shifters 770 provides a 0 to 360 degrees of phase shifts.

In FIG. 8, the phase shifters 770 are shown to be coupled to the adder 780. The adder is then coupled to the frequency mixers 760 and then to the intermediate processing stages 750. One of the frequency mixers 760 can be an I path mixer (or for mixing a sine waveform) and another one of the frequency mixers can be a Q path mixer (or for mixing a cosine waveform). Each of the intermediate processing stages 750 can be a filter and/or a variable gain amplifier (VGA)

In an exemplary operation of the illustrated receiver node 710 of FIG. 8, the phase shifters 770 receive inbound RF signals from the antennas 740 via respective one of the low noise amplifiers (LNAs) 755 coupled between the antennas 740 and the phase shifters 770. Each of the phase shifters 770 then respectively phase shifts the RF signals. The phase-shifted RF signals are then combined by the adder 780 into combine-phase-shifted RF signals (e.g., having a first 0 to 360 degrees of phase shifts and a second 0 to 360 degree of phase shifts).

The frequency mixers 760 then respectively mix the combined RF signals into a first mixed signals (e.g., having a sine waveform) and a second mixed signals (e.g., having a cosine waveform). The intermediate processing stages 750 then preliminarily process the first and second mixed signals, respectively (e.g., by filtering and/or amplifying the signals) to produce preliminarily processed signals. The digital signal processor (or communications controller) 730 then recovers and/or further processes the raw data from the preliminarily processed signals in accordance with the particular communications standard in use.

In view of the forgoing, an exemplary embodiment of the present invention provides an RF phase shifter. The RF phase shifter has a transconductor, a 90 degrees phase shifting circuit, a gain controller, and an adder. The transconductor produces first and second currents from an input voltage. The 90 degrees phase shifting circuit is coupled to the transconductor and generates 90 degree phase shift between these two currents. The gain controller is providing a first gain to the first current and a second gain to the second current. The adder is coupled to the first and second parts of the 90 degrees phase shifting circuit and adds the first current with the second current which have 90 degrees phase difference and may have different amplitudes. In this exemplary RF phase shifter, when the gain controller is turned off, the 90 degrees phase shifting circuit provides the first current and the second current with a phase angle of 90 degrees with respective to each other and/or with equal amplitudes and the adder then adds the first current and the second current to generate an output current having a phase angle of 45 degrees with respective to the first current; and, when the gain controller is turned on, the gain controller provides the first gain and the second gain to the first and second currents to vary the amplitudes of the first and/or second currents and/or to vary the phase angle of the output current with respect to the first current.

In one exemplary embodiment of the present invention, an RF phase shifter has a first capacitor, a first resistor, a second resistor, a second capacitor, at least one input node, at least one output node, a first gain controller, and a second gain controller. The first capacitor has a first capacitor node and a second capacitor node. The first resistor is coupled between the first capacitor node and a ground. The second resistor has a first resistor node and a second resistor node. The second capacitor is coupled between the first resistor node and the ground. The at least one input node is coupled to the first capacitor node and the first resistor node. The at least one output node is coupled to the second capacitor node and the second resistor node. The first gain controller is coupled to the first capacitor node, and the second gain controller is coupled to the first resistor node. In this exemplary embodiment, the first capacitor and the first resistor and the second resistor and the second capacitor provide first and second signals with 90 degrees different in phase angle; the first gain controller provides a first gain to the first signal and the second gain controller provides a second gain to the second signal; and the at least one output node adds the first signal with the second signal to provide a third signal having a desired phase angle with respect to the first signal. The desired phase angle can range from about 0 to 360 degrees with respect to the first signal.

In one exemplary embodiment of the present invention, an RF communication system includes a transmit node for transmitting RF signals and a receive node having a plurality of antennas for receiving the RF signals. The receive node has a plurality of phase shifters, each of the phase shifters coupling a respective one of the antennas and having a transconductor, a 90 degrees phase shifting circuit, a gain controller, and an adder. The transconductor produces first and second currents from an input voltage. The 90 degrees phase shifting circuit is coupled to the transconductor and has first and second circuit portions for providing the first and second currents with a 90 degrees difference in phase angle. The gain controller is for providing a first gain to the first current and a second gain to the second current. The adder is coupled to the first and second parts of the 90 degrees phase shifting circuit and adds the first and second current. In this exemplary embodiment, when the gain controller is turned off, the 90 degrees phase shifting circuit provides the first current and the second current with a phase angle of 90 degrees with respect to each other; and, when the gain controller is turned on, the gain controller provides the first gain and the second gain to the 90 degrees phase shifting circuit to vary the amplitude of the first current and/or the amplitude of the second current and the adder adds the first and second currents with the varied amplitude (s) to generate an output current with a desired phase angle with respect to the first current.

While the invention has been described in connection with certain exemplary embodiments, it is to be understood by those skilled in the art that the invention is not limited to the disclosed embodiments, but, on the contrary, is intended to cover various modifications included within the spirit and scope of the appended claims and equivalents thereof.

What is claimed is:

1. A radio frequency (RF) phase shifter comprising:
   a transconductor for producing first and second currents from an input voltage;
   a 90 degrees phase shifting circuit coupled to the transconductor, the 90 degrees phase shifting circuit having a first circuit portion for shifting the first current and a second circuit portion for shifting the second current;
   a gain controller for providing a first gain to the first current and a second gain to the second current; and
   an adder coupled to the first and second circuit portions of the 90 degrees phase shifting circuit and for adding the shifted and gained first current with the shifted and gained second current;
   wherein, when the gain controller is turned off, the 90 degrees phase shifting circuit provides the first current and the second current with a phase angle of 90 degrees with respect to each other and the adder adds the first current and the second current to generate an output current having a phase angle of 45 degrees with respect to the first current; and
   wherein, when the gain controller is turned on, the gain controller provides the first gain and the second gain to the 90 degrees phase shifting circuit to vary the phase angle of the output current with respect to the first current.

2. The RF phase shifter of claim 1, wherein the first circuit portion of the 90 degrees phase shifting circuit comprises a first capacitor having a first capacitor node and a second capacitor node and a first resistor coupled between the first capacitor node and a ground, and wherein the second circuit portion of the 90 degrees phase shifting circuit comprises a second resistor having a first resistor node and a second resistor node and a second capacitor coupled between the first resistor node and the ground.

3. The RF phase shifter of claim 2, wherein the adder is coupled to the first and second circuit portions of the 90 degrees phase shifting circuit through the second capacitor node and the second resistor node, respectively.

4. The RF phase shifter of claim 1, wherein the transconductor comprises a pair of transconductance transistors.

5. The RF phase shifter of claim 4, further comprising a pair of cascode transistors, wherein a first one of the pair of transconductance transistors is coupled to a first one of the pair of cascode transistors via a first connection-control node, and wherein a second one of the pair of transconductance transistors is coupled to a second one of the pair of cascode transistors via a second connection-control node.

6. The RF phase shifter of claim 5, wherein the gain controller provides the first gain to the first circuit portion via the first connection-control node and the second gain to the second circuit portion via the second connection-control node.

7. The RF phase shifter of claim 5, wherein the gain controller comprises a first control transistor coupled to the first connection-control node and a second control transistor coupled to the second connection-control node.

8. The RF phase shifter of claim 7, wherein the first control transistor is coupled to a first control voltage and the second control transistor is coupled to a second control voltage.

9. The RF phase shifter of claim 5, wherein the gain controller comprises a plurality of first control transistors coupled to the first connection-control node in parallel and a plurality of second control transistors coupled to the second connection-control node in parallel.

10. The RF phase shifter of claim 9, wherein each of the first and second control transistors is individually controlled.

11. The RF phase shifter of claim 1, wherein the transconductor comprises a first pair of transconductance transistors for providing a differential version of the first current and a second pair of transconductance transistors for providing a differential version of the second current.

12. The RF phase shifter of claim 11, further comprising a first pair of cascode transistors and a second pair of cascode transistors, wherein a first one of the first pair of transconductance transistors is coupled to a first one of the first pair of cascode transistors via a first connection-control node, wherein a second one of the first pair of transconductance transistors is coupled to a second one of the first pair of cascode transistors via a second connection-control node, wherein a first one of the second pair of transconductance transistors is coupled to a first one of the second pair of cascode transistors via a third connection-control node, and wherein a second one of the second pair of transconductance transistors is coupled to a second one of the second pair of cascode transistors via a fourth connection-control node.

13. The RF phase shifter of claim 12, further comprising a third pair of cascode transistors for polarity changing, wherein the first one of the first pair of transconductance transistors is coupled to a first one of the third pair of cascode transistors via the first connection-control node, and wherein the second one of the first pair of transconductance transistors is coupled to the second one of the third pair of cascode transistors via the second connection-control node.

14. The RF phase shifter of claim 13, wherein the first one of the third pair of cascode transistors and the second one of the first pair of cascode transistors are both coupled to a first polarity-control node, and wherein the second one of the third pair of cascode transistors and the first one of the first pair of cascode transistors are both coupled to a second polarity-control node.

15. The RF phase shifter of claim 13, wherein the first one of the third pair of cascode transistors and the second one of the first pair of cascode transistors are coupled to provide opposite polarities for a first differential part of the first current and wherein the second one of the third pair of cascode transistors and the first one of the first pair of cascode transistors are coupled to provide opposite polarities for a second differential part of the first current.

16. A radio frequency (RF) phase shifter comprising:
a first capacitor having a first capacitor node and a second capacitor node;
a first resistor coupled between the first capacitor node and a ground;
a second resistor having a first resistor node and a second resistor node;
a second capacitor coupled between the first resistor node and the ground;
at least one input node coupled to the first capacitor node and the first resistor node;
at least one output node coupled to the second capacitor node and the second resistor node;
a first gain controller coupled to the first capacitor node; and
a second gain controller coupled to the first resistor node;
wherein the first capacitor and the first resistor provide a first signal and the second capacitor and the second resistor provide a second signal;
wherein the first signal and the second signal are 90 degrees different in phase angle; and
wherein the first gain controller provides a first gain to the first signal and the second gain controller provides a second gain to the second signal; and
wherein the at least one output node adds the first signal with the second signal to provide a third signal having a desired phase angle with respect to the first signal.

17. The RF phase shifter of claim 16, wherein the desired phase angle ranges from about 0 to 360 degrees with respect to the first signal.

18. The RF phase shifter of claim 16, further comprising a pair of transconductors, wherein the at least one input node comprises a first input node coupled to a first one of the pair of transconductors and a second input node coupled to a second one of the pair of transconductors.

19. The RF phase shifter of claim 16, further comprising a pair of cascode transistors, wherein the first gain controller comprises a plurality of first control transistors coupled to the first capacitor node via a first one of the pair of cascode transistors and the second gain controller comprises a plurality of second control transistors coupled to the first resistor node via a second one of the pair of cascode transistors.

20. The RF phase shifter of claim 16, further comprising a first pair of cascode transistors coupled to the at least one input node and a second pair of cascode transistors, wherein the first pair of cascode transistors provides an input to the first capacitor node and the first resistor node from the at least one input node at a first polarity and the second pair of cascode provides the input to the first capacitor node and the first resistor node at a second polarity.

21. A radio frequency (RF) communication system comprising:
a transmit node for transmitting RF signals;
a receive node having a plurality of antennas for receiving the RF signals, the receive node further comprising a plurality of phase shifters, each of the phase shifters coupling a respective one of the antennas and comprising:
a transconductor for producing first and second currents from an input voltage;
a 90 degrees phase shifting circuit coupled to the transconductor, the 90 degrees phase shifting circuit having first and second circuit portions for providing first and second currents;
a gain controller for providing a first gain to the first current and a second gain to the second current; and
an adder coupled to the first and second parts of the 90 degrees phase shifting circuit and for adding the separately gained first and second currents;
wherein, when the gain controller is turned off, the 90 degrees phase shifting circuit provides the first current and the second current with a phase angle of 90 degrees with respect to each other and the adder adds the first current and the second current to generate an output current having a phase angle of 45 degree with respect to the first current; and
wherein, when the gain controller is turned on, the gain controller provides the first gain and the second gain to the 90 degrees phase shifting circuit to vary the an amplitude of the first current and an amplitude of the second current.

22. A system for generating arbitrary phase shift using a radio frequency (RF) phase shifter, the system comprising:
means for providing a first vector;
means for providing a second vector perpendicular to the first vector;
means for providing a first gain to the means for providing the first vector;
means for providing a second gain to the means for providing the second vector; and
means for adding the first vector provided with the first gain with the second vector provided with the second gain to produce a third vector having an arbitrary phase shift with respect to the first vector.

23. The system of claim 22, wherein the arbitrary phase shift of the third vector is between 0 and 90 degrees.

24. The system of claim 22, further comprising
means for providing a third vector corresponding to a negative of the first vector;
means for providing a fourth vector corresponding to a negative of the second vector;
means for providing a third gain to the means for providing the third vector;

means for providing a fourth gain to the means for providing the fourth vector; and means for adding one of the first vector provided with the first gain, the second vector provided with the second gain, the third vector provided with the third gain, and the fourth vector provided with the fourth gain with another one of the first vector provided with the first gain, the second vector provided with the second gain, the third vector provided with the third gain, and the fourth vector provided with the fourth gain to produce the third vector.

25. The system of claim 24, wherein the arbitrary phase shift of the third vector is between 0 and 360 degrees.

* * * * *